(12) United States Patent
Chao

(10) Patent No.: US 8,869,004 B2
(45) Date of Patent: Oct. 21, 2014

(54) MEMORY STORAGE DEVICE, MEMORY CONTROLLER THEREOF, AND DATA TRANSMISSION METHOD THEREOF

(75) Inventor: Shen-Yi Chao, Hsinchu County (TW)

(73) Assignee: Phison Electronics Copr., Miaoli (TW)

( * ) Notice: Subject to any disclaimer, the term of this patent is extended or adjusted under 35 U.S.C. 154(b) by 78 days.

(21) Appl. No.: 13/342,204

(22) Filed: Jan. 3, 2012

(65) Prior Publication Data

US 2013/0111287 A1 May 2, 2013

(30) Foreign Application Priority Data

Nov. 1, 2011 (TW) .............................. 100139835 A

(51) Int. Cl.
*G11C 29/00* (2006.01)
(52) U.S. Cl.
USPC ............................ 714/763; 714/773; 714/746
(58) Field of Classification Search
USPC .................. 714/763, 746, 755, 773, 719, 710
See application file for complete search history.

(56) References Cited

U.S. PATENT DOCUMENTS

| | | | | |
|---|---|---|---|---|
| 5,642,307 A | * | 6/1997 | Jernigan | 365/103 |
| 6,141,765 A | * | 10/2000 | Sherman | 713/400 |
| 7,308,524 B2 | * | 12/2007 | Grundy et al. | 711/103 |
| 7,903,476 B2 | * | 3/2011 | Blum | 365/189.05 |
| 7,924,628 B2 | * | 4/2011 | Danon et al. | 365/185.28 |
| 7,966,443 B2 | * | 6/2011 | Grundy et al. | 711/5 |
| 8,244,993 B2 | * | 8/2012 | Grundy et al. | 711/154 |

* cited by examiner

*Primary Examiner* — Fritz Alphonse
(74) *Attorney, Agent, or Firm* — Jianq Chyun IP Office

(57) ABSTRACT

A memory storage device, a memory controller thereof and a data transmission method thereof are provided. The memory storage device includes a rewritable non-volatile memory module having a first and a second memory dies, and the first and the second memory dies are coupled to the memory controller through the same data input/output bus. The method includes transmitting a read command to the first memory die and then transmitting a write command to the second memory die by the memory controller. The method further includes controlling the first and the second memory dies to respectively read out and put data onto the data input/output bus in accordance with the read command and write the data from the data input/output bus into the second memory die in accordance with the write command at the same time by the memory controller.

27 Claims, 9 Drawing Sheets

MEMORY STORAGE DEVICE, MEMORY CONTROLLER THEREOF, AND DATA TRANSMISSION METHOD THEREOF

CROSS-REFERENCE TO RELATED APPLICATION

This application claims the priority benefit of Taiwan application serial no. 100139835, filed on Nov. 1, 2011. The entirety of the above-mentioned patent application is hereby incorporated by reference herein and made a part of this specification.

BACKGROUND

1. Technology Field

The present invention relates to a method for transmitting data between memory dies. Specifically, the present invention relates to a memory storage device and a memory controller thereof using the aforementioned method.

2. Description of Related Art

Rewritable non-volatile memory is one of the most adaptable memories for electronic products due to its data non-volatility, low power consumption, small volume, and non-mechanical structure. Solid State Drive (SSD) is an example of utilizing the rewritable non-volatile memory as the storage media, and has been widely applied in the host computer as a main hard disk.

Most SSD on the market has the multiple channels (i.e., data input/output bus) structure, and each channel will be coupled with multiple memory dies. FIG. 1 is the internal schematic view of a prior art of a SSD which supports the NAND flash interface. The SSD 100 includes N channels (i.e., the channels $CH_1$ to $CH_N$), and each channel is coupled to M memory dies. Take all the memory dies $F_{1-1}$ to $F_{1-M}$ that are coupled to the channel $CH_1$ as example, because the memory dies $F_{1-1}$ to $F_{1-M}$ share the same read signal $RE_1$, the write signal $WE_1$ and the data input/output bus $D_1$, for the channel $CH_1$, only one of the memory dies $F_{1-1}$ to $F_{1-M}$ may execute data transmission at the same time. Accordingly, when the different memory dies coupled to the same channel need to conduct data transmission, the time for each memory die to transmit data cannot overlap.

For example, to copy a data in the memory die $F_{1-1}$ to the memory die $F_{1-2}$, under the structure illustrated in FIG. 1, the memory die $F_{1-1}$ needs to be first enabled, and use the read signal $RE_1$ and the write signal $WE_1$ to control the memory die $F_{1-1}$ to read out the data. In addition, the data is stored to an external memory space through the data input/output bus $D_1$. Such external memory space may be the buffer memory 1105 of the memory controller 1100, and etc. After the data read operation is complete, use the read signal $RE_1$, the write signal $WE_1$ and the data input/output bus $D_1$ to write the data in the buffer memory 1105 back to the memory die $F_{1-2}$. Because the read signal $RE_1$ and the write signal $WE_1$ are in different states when controlling the memory die to read or write the data, when conducting data transmission between the memory die $F_{1-1}$ and memory die $F_{1-2}$ using the same read signal $RE_1$ and the write signal $WE_1$, the data transmission time for reading out data from the memory die $F_{1-1}$ and for writing data to the memory die $F_{1-2}$ cannot overlap.

For the SSD applying the open NAND flash interface (ONFI) or the toggle NAND flash interface, only one at a time of all the memory dies coupled to the same channel can conduct data transmission. Accordingly, more time will be wasted when conducting data transmission among the aforementioned memory dies.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention provides a data transmission method, a memory controller and a memory storage device for increasing the speed of data transmission among multiple memory dies sharing the same data input/output bus.

The present invention provides a data transmission method adapted for a memory storage device with a rewritable non-volatile memory module. The rewritable non-volatile memory module includes at least one first memory die and at least one second memory die. The at least one first memory die and the at least one second memory die are coupled to the memory controller of the memory storage device by the same data input/output bus. The method includes having the memory controller to sequentially transmit a read command to the at least one first memory die and transmit a write command to the at least one second memory die. The method further includes having the memory controller control the at least one first memory die and the at least one second memory die to simultaneously and respectively output the data from the at least one first memory die and put the data onto the data input/output bus in accordance with the read command, and write the data from the data input/output bus to the at least one second memory die in accordance with the write command.

In another embodiment, the present invention provides a memory controller for managing the rewritable non-volatile memory module of the memory storage device. The memory controller includes a host system interface, a memory interface, and a memory management circuit. The host system interface is coupled to the host system. The memory interface is coupled to at least one first memory die and at least one second memory die of the rewritable non-volatile memory module by the same data input/output bus. The memory management circuit is coupled to the host system interface and the memory interface. The memory management circuit sequentially transmit a read command to the at least one first memory die and transmit a write command to the at least one second memory die. Also, the memory management circuit controls the at least one first memory die and the at least one second memory die to simultaneously and respectively output data from the at least one first memory die and put the data onto the data input/output bus in accordance with the read command, and write the data from the data input/output bus to the at least one second memory die in accordance with the write command.

According to another exemplary embodiment, the present invention provides a memory storage device. The memory storage device includes a rewritable non-volatile memory module, a connector and a memory controller. The rewritable non-volatile memory module includes at least one first memory die and at least one second memory die. The connector is coupled to the host system. The memory controller is coupled to the connector, and further coupled to the at least one first memory die and the at least one second memory die by the same data input/output bus. The memory controller sequentially transmit a read command to the at least one first memory die and transmit a write command to the at least one second memory die. Also, the memory controller controls the at least one first memory die and the at least one second memory die to simultaneously and respectively output the data from the at least one first memory die and put the data onto the data input/output bus in accordance with the read command, and write the data from the data input/output bus to the at least one second memory die in accordance with the write command.

Accordingly, the present invention controls at least two memory dies to conduct data transmission simultaneously among multiple memory dies coupled to the same data input/output bus. That is, the data in one of the two memory dies is read and transmitted to the data input/output bus, and in the same time, the data on the data input/output bus is written into the temporary area of the other memory die. As a result, the efficiency of the memory storage device can be improved by overlapping the data read time and the data write time.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF THE EMBODIMENTS

Figure 1:
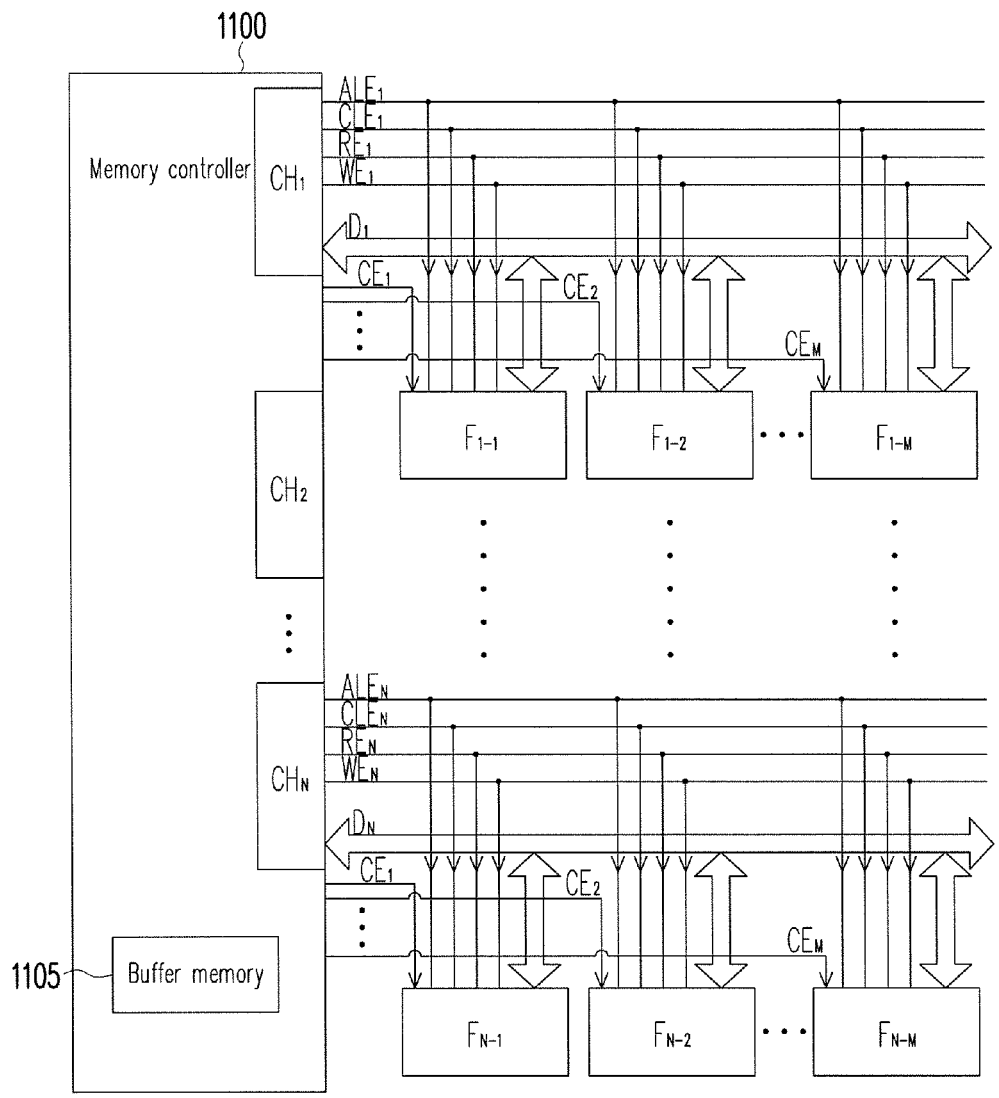
FIG. 1 is the internal schematic view of a prior art of a SSD which supports the NAND flash interface.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage device (i.e., a memory storage system), typically, includes a memory module and a controller (i.e., a control circuit). The memory storage device is usually used together with a host system so that the host system can write data into or read data from the memory storage device. In addition, a memory storage device may include an embedded memory and a software that can be executed by a host system and substantially served as a controller of the embedded memory.

Figure 2A:
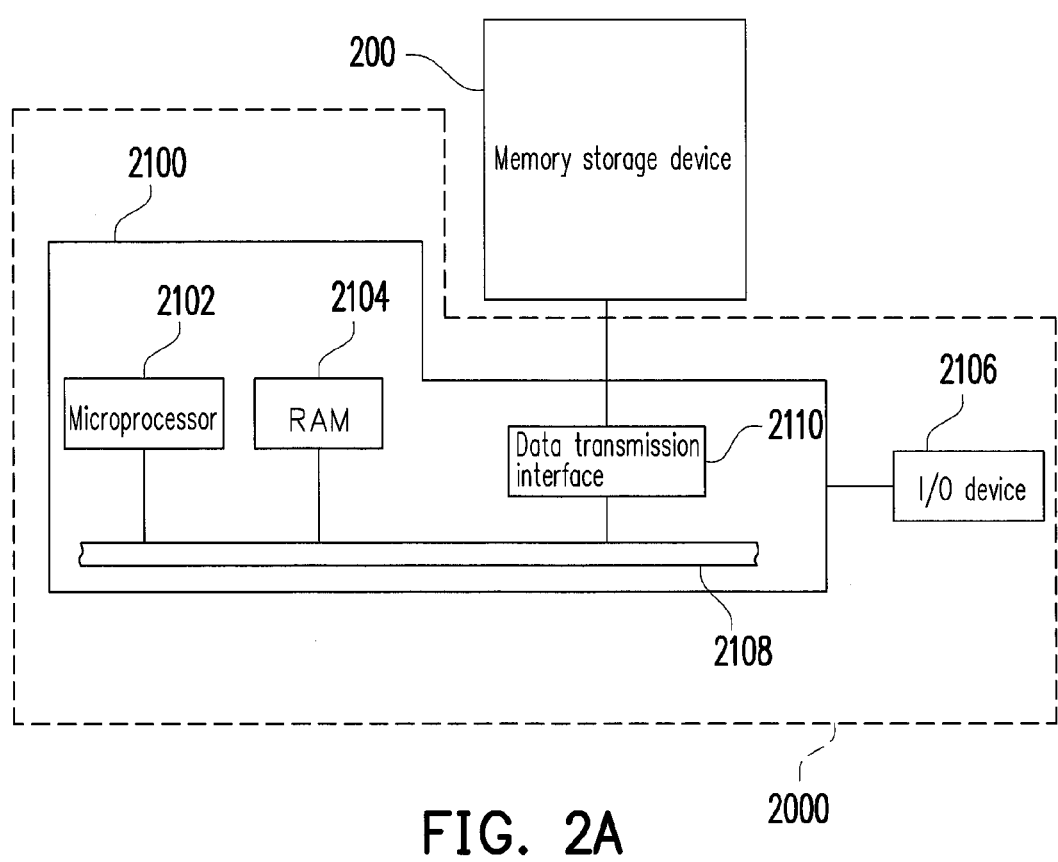
FIG. 2A is a schematic diagram of a host system using a memory storage device according to an exemplary embodiment of the present disclosure.

FIG. 2A is a schematic diagram of a host system using a memory storage device according to an exemplary embodiment of the present disclosure.

Figure 2B:
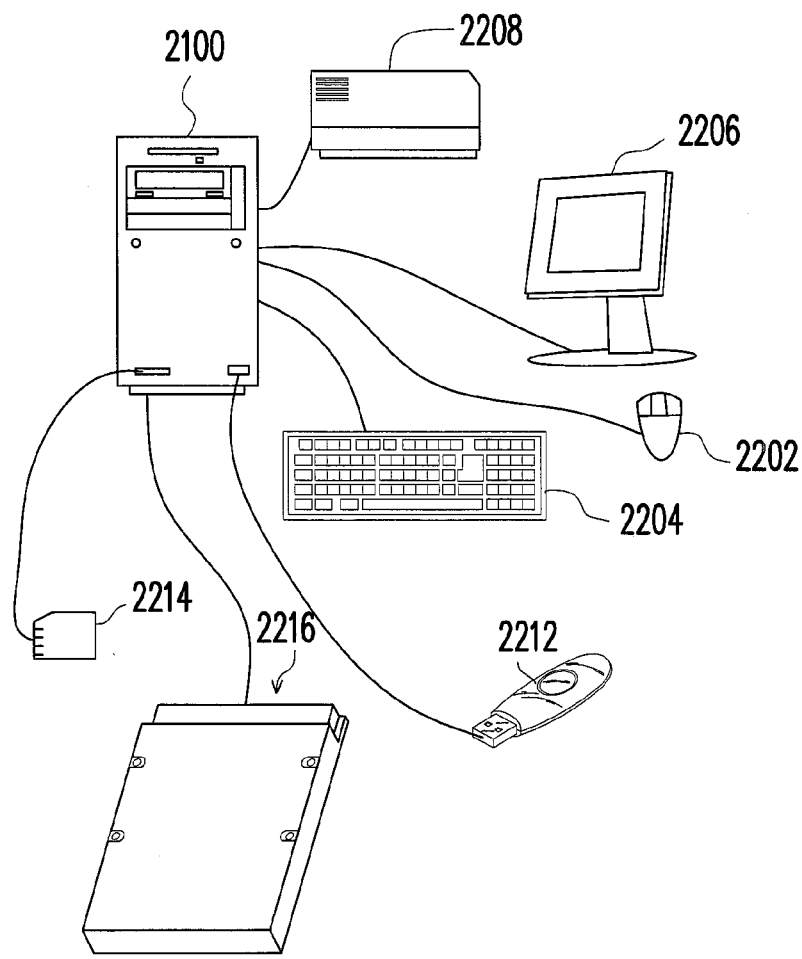
FIG. 2B illustrates a computer, an input/output (I/O) device, and a memory storage device according to the exemplary embodiment of the present disclosure.

A host system 2000 includes a computer 2100 and an input/output (I/O) device 2106. The computer 2100 includes a microprocessor 2102, a random access memory (RAM) 2104, a system bus 2108, and a data transmission interface 2110. The I/O device 2106 includes a mouse 2202, a keyboard 2204, a display 2206, and a printer 2208 as shown in FIG. 2B. It should be understood that, the devices depicted in FIG. 2B should not be construed as limitations to the present disclosure, and the I/O device 2106 may include other devices as well.

In an exemplary embodiment of the present disclosure, the memory storage apparatus 200 is coupled to other components of the host system 2000 through the data transmission interface 2110. By the operation of the microprocessor 2102, the RAM 2104, and the I/O device 2106, the host system 2000 may write data into the memory storage device 200 or read data from the memory storage device 200. For example, the memory storage device 200 may be a memory card 2214, a flash drive 2212, or a solid state drive (SSD) 2216, as shown in FIG. 2B.

Figure 2C:
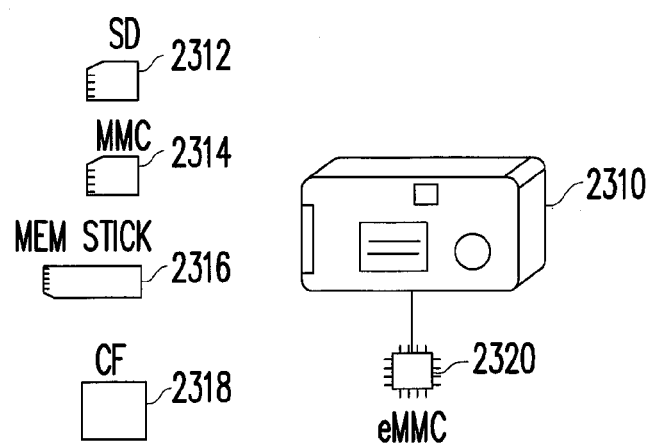
FIG. 2C schematically illustrates a host system and a memory storage device according to another exemplary embodiment of the invention.

Generally speaking, the host system 2000 may be any system that can store data. Even though the host system 2000 is described as a computer system in the present exemplary embodiment, in another exemplary embodiment of the invention, the host system 2000 may also be a cell phone, a digital camera, a video camera, a communication device, an audio player, or a video player, and etc. For example, when the host system is a digital camera 2310, the storage device may be a secure digital (SD) card 2312, a multimedia card (MMC) 2314, a memory stick (MS) 2316, a compact flash (CF) card 2318, or an embedded storage device 2320, used by the digital camera 2310, as shown in FIG. 2C. The embedded storage device 2320 includes an embedded MMC (eMMC). It should be mentioned that the eMMC is directly coupled to the motherboard of the host system.

Figure 3:
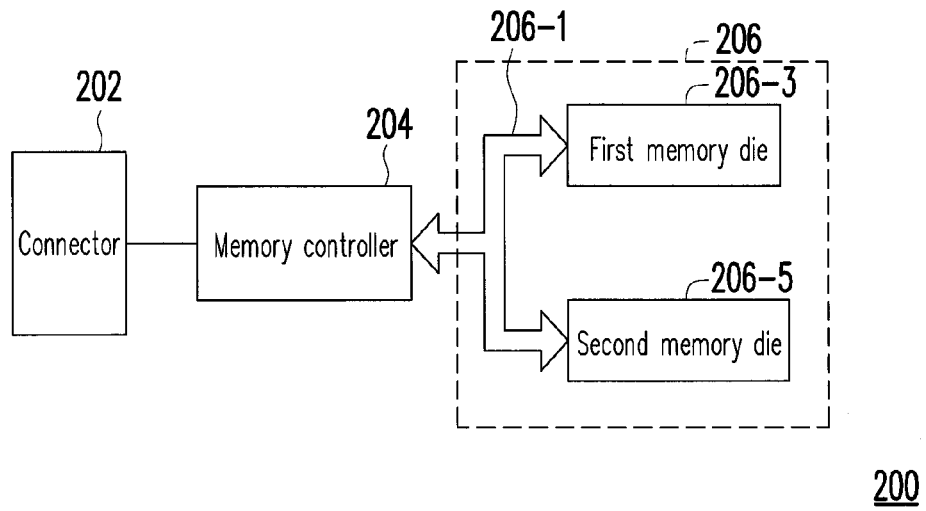
FIG. 3 is a schematic block diagram illustrating the memory storage device depicted in FIG. 2A.

FIG. 3 is a schematic block diagram of the memory storage device depicted in FIG. 2A. With reference to FIG. 3, the memory storage device 200 includes a connector 202, a memory controller 204, and a rewritable non-volatile memory module 206.

The connector 202 is coupled to the memory controller 204 and configured for coupling to the host system 2000. In the present exemplary embodiment, a kind of transmission interface supported by the connector 202 may be a serial advanced technology attachment (SATA) interface. However, in another exemplary embodiment, the types of the transmission interface of the connector 202 may be a universal serial bus (USB) interface, a MMC interface, a parallel advanced technology attachment (PATA) interface, an Institute of Electrical and Electronic Engineers (IEEE) 1394 interface, a peripheral component interconnect express (PCI-E) interface, a SD interface, a MS interface, a CF interface, an integrated drive electronics (IDE) interface, or any suitable interface which is not limited to the above selection.

The memory controller 204 executes a plurality of logic gates or control instructions implemented in a hardware form or a firmware form, and the memory controller 204 performs various data operations such as data writing, reading, and erasing in the rewritable non-volatile memory module 206 according to the host commands from the host system 2000.

The rewritable non-volatile memory module 206 is coupled to the memory controller 204. For example, the rewritable non-volatile memory module 206 may be a multi level cell (MLC) NAND flash memory module, although the disclosure is not limited thereto. The rewritable non-volatile memory module 206 may also be single level cell (SLC) NAND flash memory module, other flash memory module, or any other memory module having the same characteristics.

In this embodiment, the rewritable non-volatile memory module 206 includes a first memory die 206-3 and a second memory die 206-5. Each memory die has a plurality of memory cells for storing data. In detail, before the memory cell stored with data can be used to store new data, a data erase operation needs to be executed to such memory cell. In designing the rewritable non-volatile memory module, the memory cells are divided into a plurality of physical blocks according to the circuit layout. The physical block is the smallest erasing unit. Namely, each of the physical blocks contains the least number of memory cells that are erased all together. Each physical block has a plurality of physical pages, and a smallest unit for programming data is one physical page. However, in another exemplary embodiment, the smallest unit for writing data may be one sector or other sizes.

As illustrated in FIG. 3, the first memory die 206-3 and the second memory die 206-5 are coupled to a same data input/output bus 206-1. The memory controller 204 transmits data to the first memory die 206-3 and the second memory die 206-5 or receives data from the first memory die 206-3 and the second memory die 206-5 through the data input/output bus 206-1.

Although this embodiment of the present invention provides that the memory controller 204 is coupled to two memory dies (i.e., the first memory die 206-3 and the second memory die 206-5) by a single data input/output bus 206-1, the present invention does not limit the number of memory dies coupled to the data input/output bus. In another embodiment, the memory controller 204 may be coupled to all the memory dies of the rewritable non-volatile memory module 206 by multiple data input/output buses. Again, the present invention does not limit the number of memory dies coupled to each data input/output bus.

Figure 4:
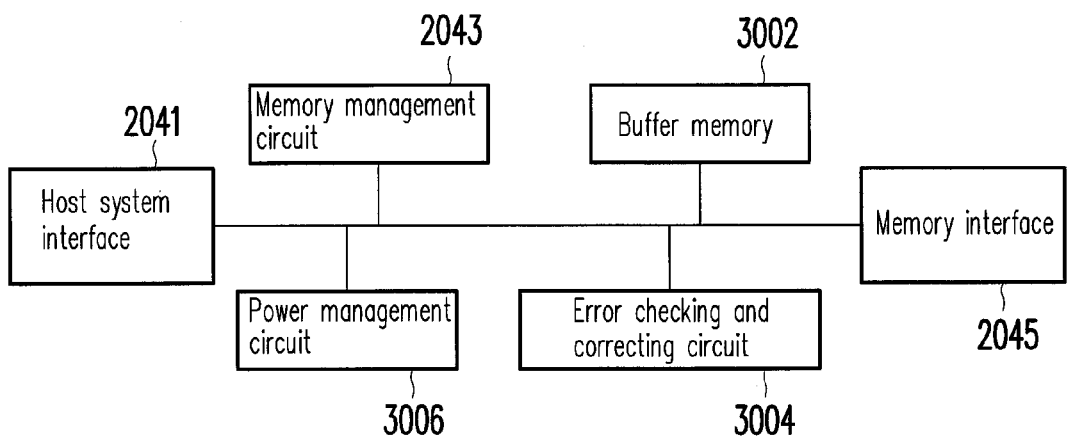
FIG. 4 is a schematic block diagram of a memory controller according to an exemplary embodiment of the present disclosure.

FIG. 4 is a schematic block diagram of a memory controller according to an exemplary embodiment of the present disclosure. Referring FIG. 4, the memory controller 204 includes a host system interface 2041, a memory management circuit 2043 and a memory interface 2045.

The host system interface 2041 is coupled to the memory management circuit 2043 and configured for coupling to the host system 2000 via the connector 202. The host system interface 2041 is used to receive and recognize the commands and data transmitted from the host system 2000. Accordingly, the commands and data from the host system 2000 are transmitted to the memory management circuit 2043 via the host system interface 2041. According to the present embodiment, the host system interface 2041 is a SATA interface. However, in other exemplarily embodiments, the host system interface 2041 may also be a USB interface, a MMC interface, a SATA interface, an IEEE 1394 interface, a PCI Express interface, a SD interface, a MS interface, a CF interface, an IDE interface, or other standardized interfaces.

The memory management circuit 2043 is configured for controlling the overall operation of the memory controller 204. To be specific, the memory management circuit 2043 has a plurality of control commands, and the control commands are executed to implement the data transmission method in the present disclosure, when the memory storage device 200 is in operation. The additional signal types and detailed data transmission method will be illustrated below along with the figures.

In an exemplary embodiment, the control commands of the memory management circuit 2043 are implemented in a firmware form. For example, the memory management circuit 2043 has a micro-processor unit (not shown) and a read-only memory (not shown), and these control commands are burned into the read-only memory. When the memory storage device 200 is enabled, the aforementioned control commands are executed by the micro-processor unit to accomplish the data transmission method according to this exemplary embodiment.

In another exemplary embodiment of the invention, the control commands of the memory management circuit 2043 may also be stored in a specific area of the rewritable non-volatile memory module 206 (for example, a system area exclusively used for storing system data in the rewritable non-volatile memory module 206) as program codes. Additionally, the memory management circuit 2043 may have a microprocessor unit (not shown), a read-only memory (not shown) and a random access memory (not shown). In particular, the ROM has boot codes, and when the memory controller 204 is enabled, the microprocessor unit first executes the boot codes to load the control instructions from the rewritable non-volatile memory module 206 into the RAM of the memory management circuit 2043. Then, the micro-processor unit runs these control commands to execute the data transmission method according to this exemplary embodiment. Additionally, the control commands of the memory management circuit 2043 may also be implemented in a hardware form according to another exemplary embodiment of the present disclosure.

The memory interface 2045 is coupled to the memory management circuit 2043 and configured for coupling the memory controller 204 to the rewritable non-volatile memory module 206. Accordingly, the memory controller 204 may execute related operations to the rewritable non-volatile memory module 206. Namely, data to be written into the rewritable non-volatile memory module 206 is converted by the memory interface 2045 into a format acceptable to the rewritable non-volatile memory module 206.

In another exemplary embodiment of the present disclosure, the memory controller 204 still includes a buffer memory 3002, which is coupled to the memory management circuit 2043. The buffer memory 3002 may be a static random access memory (SRAM) or dynamic random access memory (DRAM), although the invention is not limited thereto. The buffer memory 3002 is coupled to the memory management circuit 2043 and configured to temporarily store data received from the host system 2000 or data received from the rewritable non-volatile memory module 206.

In another exemplary embodiment of the present disclosure, the memory controller 204 still includes an error checking and correcting circuit 3004, which is coupled to the memory management circuit 2043. The error checking and correcting circuit 3004 is configured to perform an error checking and correcting procedure to ensure the correctness of the data. To be specific, when the memory management circuit 2043 receives a write command from the host system 2000, the error checking and correcting circuit 3004 generates an error checking and correcting (ECC) code for the data corresponding to the write command, and the memory management circuit 2043 writes the data corresponding to the write command and the corresponding ECC code into the rewritable non-volatile memory module 206. Subsequently, when the memory management circuit 2043 reads the data from the rewritable non-volatile memory module 206, the memory management circuit 2043 simultaneously reads the ECC code that such data corresponds to, and the error checking and correcting circuit 3004 executes the ECC procedure to the read data based on such ECC code.

In another exemplary embodiment of the present disclosure, the memory controller 204 still includes a power management circuit 3006. The power management circuit 3006 is coupled to the memory management circuit 2043 and configured for controlling the power of the memory storage device 200.

In this embodiment, when a data is to be transmitted between the first memory die 206-3 and the second memory die 206-5 coupled to the same data input/output bus 206-1, the memory management circuit 2043 first transmits the read command to the memory die acting as a source end, and then transmits the write command to the memory die acting as a destination end. In addition, the memory management circuit 2043 controls the aforementioned two memory dies to simultaneously execute data transmission operation by a command issue method undisclosed in traditional memory storage device structures. For example, when the memory management circuit 2043 reads out data from the first memory die 206-3 and puts the data onto the data input/output bus 206-1 (hereinafter the "data read operation"), the memory management circuit 2043 writes the data from the data input/output bus 206-1 to the second memory die 206-5 (hereinafter the "data write operation") in the same time.

In the following embodiments, we assume that the first memory die 206-3 is the source end of the data, and the second memory die 206-5 is the destination end of the data. Here are multiple embodiments explaining the detailed operation of the data transmission method of the present invention that supports rewritable non-volatile memory module 206 of different interfaces.

Figure 5:
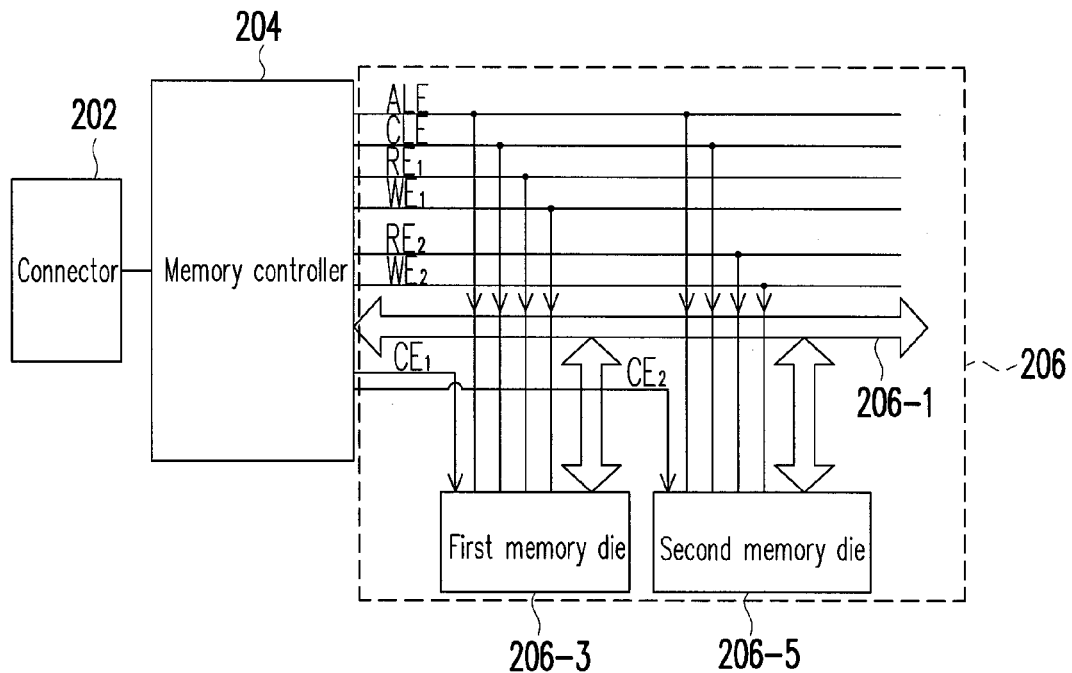
FIG. 5 schematically illustrates a memory storage device according to one exemplary embodiment of the present invention.

FIG. 5 schematically illustrates a memory storage device according to one exemplary embodiment of the present invention. In this embodiment, the rewritable non-volatile memory module 206 and the memory interface 2045 support the NAND flash interface.

Referring to FIG. 5, a control signal ALE (i.e., an address latch enable signal), a control signal CLE (i.e., a command latch enable) and the data input/output bus 206-1 are used collectively by the first memory die 206-3 and the second memory die 206-5. Contrary to the traditional memory storage device that supports the NAND flash interface, in the present embodiment, the first memory die 206-3 and the second memory die 206-5 each has a read signal and a write signal. The first memory die 206-3 corresponds to the first read signal $RE_1$ and the first write signal $WE_1$, and the second memory die 206-5 corresponds to the second read signal $RE_2$ and the second write signal $WE_2$.

If the data in the first memory die 206-3 is to be copied to the second memory die 206-5, the memory management circuit 2043 first completes respectively issuing commands to the first memory die 206-3 and the second memory die 206-5. To be specific, in the present embodiment, if the enable signals $CE_1$ and $CE_2$ are low active signals, the memory management circuit 2043 first asserts the enable signal $CE_1$ to low level (i.e. the enable state) to enable the first memory die 206-3, and issues read command to the first memory die 206-3 by the data input/output bus 206-1. After read command transmission is completed, the memory management circuit 2043 de-asserts the enable signal $CE_1$ to high level (i.e. the disable state) to temporarily disable the first memory die 206-3, and asserts the enable signal $CE_2$ to low level to enable the second memory die 206-5. Then, the memory management circuit 2043 issues the write command to the second memory die 206-5 by the data input/output bus 206-1. During the command issuance period, the control signal ALE is at the low level and the control signal CLE is at the high level. Accordingly, the first memory die 206-3 and the second memory die 206-5 may identify, according to the state of the control signals ALE and CLE, that the data input/output bus 206-1 contains a command, instead of a data.

After the first memory die 206-3 and the second memory die 206-5 receives read command and write command respectively and leaves the busy state, by the respective corresponding read signal and write signal of the first memory die 206-3 and the second memory die 206-5, the memory management circuit 2043 makes the first memory die 206-3 transmit the data stored therein to the data input/output bus 206-1 and the second memory die 206-5 write the data on the data input/output bus 206-1 thereto in the same time.

Figure 6:
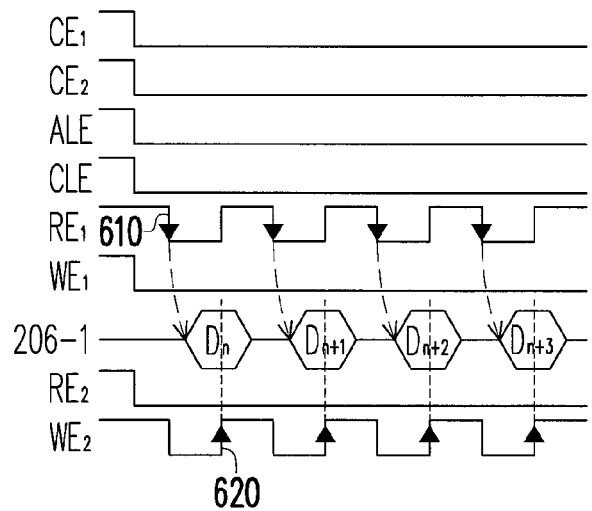
FIG. 6 is a time sequence diagram showing a first memory die and a second memory die executing data read operation and data write operation simultaneously according to an exemplary embodiment of the invention.

FIG. 6 illustrates the time sequence of the first memory die 206-3 and the second memory die 206-5 respectively executing data read operation and data write operation. Referring to FIG. 6, to conduct data transmission, the memory management circuit 2043 sets the address latch enable (ALE) and the command latch enable (CLE) to low level. In addition, the memory management circuit 2043 asserts the enable signals $CE_1$ and $CE_2$ to maintain low level so as to simultaneously enable the first memory die 206-3 and the second memory die 206-5. Moreover, the memory management circuit 2043 assigns the first read signal $RE_1$ and the first write signal $WE_1$ to the first memory die 206-3, and assigns the second read signal $RE_2$ and the second write signal $WE_2$ to the second memory die 206-3, so as to simultaneously and respectively trigger the first memory die 206-3 to output data from the first memory die 206-3 and put the data onto the data input/output bus 206-1 in accordance with the read command and the second memory die 206-5 to write the data from the data input/output bus 206-1 to the second memory die 206-5 in accordance with the write command.

In detail, the memory management circuit 2043 simultaneously assigns the first write signal $WE_1$ and the second read signal $RE_2$ maintained at a first specific level to the first memory die 206-3 and the second memory die 206-5, respectively. Then, the memory management circuit 2043 simultaneously assigns the first read signal $RE_1$ and the second write signal $WE_2$ to the first memory die 206-3 and the second memory die 206-5, respectively. The first read signal $RE_1$ and the second write signal $WE_2$ are strobe signals. That is, the signal will be at the first specific level and the second specific level alternately. In this embodiment, for example, the first specific level is the low level and the second specific level is the high level.

After the memory management circuit 2043 assigns the aforementioned signals, the first memory die 206-3 outputs the data from the memory cell and transmits the data to the data input/output bus 206-1 according to the read command at each first type of edge (e.g., the falling edge) of the first read signal $RE_1$. The second memory die 206-5 stores the data transmitted on the data input/output bus 206-1 into a temporary area (not illustrated, e.g., a static random access memory) of the second memory die 206-5 according to the write command at each second type of edge (e.g., the rising edge) of the second write signal $WE_2$.

As illustrated in FIG. 6, the first memory die 206-3 transmits the data $D_n$ to the data input/output bus 206-1 at the first falling edge 610 of the first read signal $RE_1$, and the second memory die 206-5 stores the data $D_n$ from the data input/output bus 206-1 to the temporary area at the first rising edge 620 of the second write signal $WE_2$, and so on.

As a result, reading data from the first memory die 206-3 can be conducted simultaneously with writing such data to the temporary area of the second memory die 206-5. Because the time of reading the data from the first memory die 206-3 and putting such data onto the data input/output bus 206-1 may overlap with the time of writing the data from the data input/output bus 206-1 into the temporary area of the second memory die 206-5, the processing efficiency of the memory storage device 200 can be enhanced.

Figure 7:
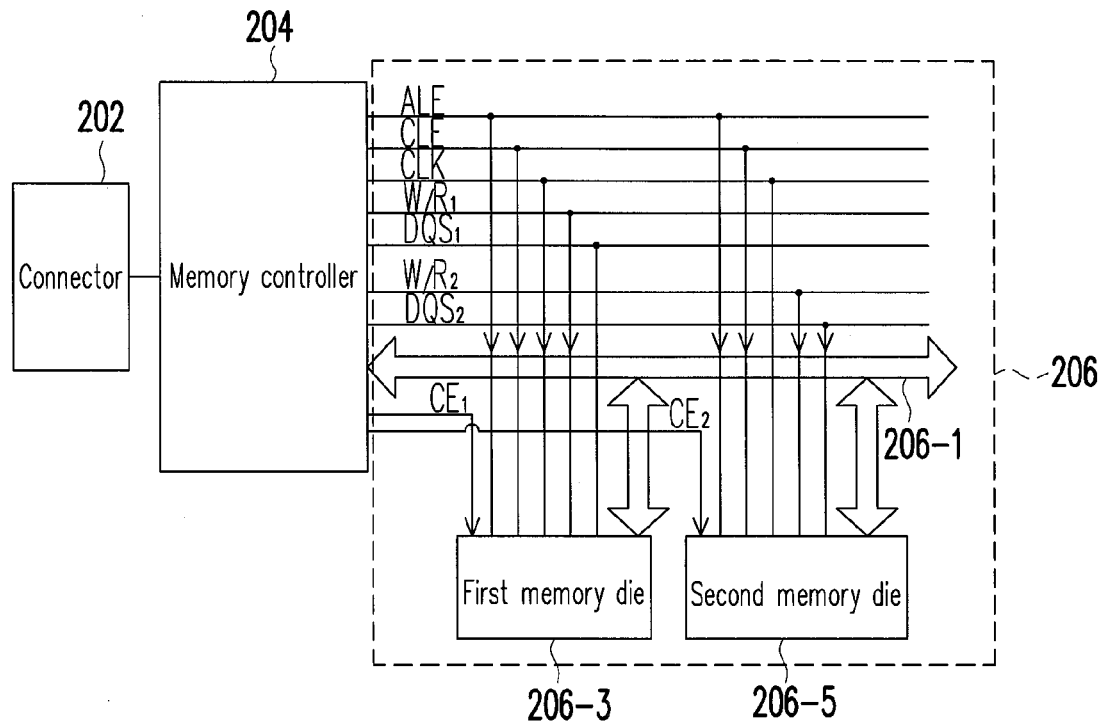
FIG. 7 schematically illustrates a memory storage device according to another exemplary embodiment of the present invention.

FIG. 7 schematically illustrates a memory storage device according to one exemplary embodiment of the present invention. In this embodiment, the rewritable non-volatile memory module 206 and the memory interface 2045 support the open NAND flash interface (ONFI). In traditional ONFI structure, all the memory dies coupled to the same data input/output bus must share the same write/read signal and the data queue strobe (DQS) signal. Because the state of the write/read signal is different when the memory die conducts data read operation and the data write operation, to enable the time of data read to overlap with the time of data write, according to the embodiment in FIG. 7, the first memory die 206-3 and the second memory die 206-5 coupled to the same data input/output bus 206-1 each has a write/read signal and a data queue strobe signal. In detail, the first write/read signal $W/R_1$ and the first data queue strobe signal $DQS_1$ correspond to the first memory die 206-3, and the second write/read signal $W/R_2$ and the second data queue strobe signal $DQS_2$ correspond to the second memory die 206-5. Still, the control signals ALE, CLE and the clock signal CLK are shared by the first memory die 206-3 and the second memory die 206-5, as in the traditional structure.

When the data in the first memory die 206-3 is to be copied to the second memory die 206-5, the memory management circuit 2043 sequentially issues a read command and a write command to the first memory die 206-3 and the second memory die 206-5. The command issuing method is the same as or similar to the foregoing exemplary embodiment and thus is not repeated herein.

Figure 8:
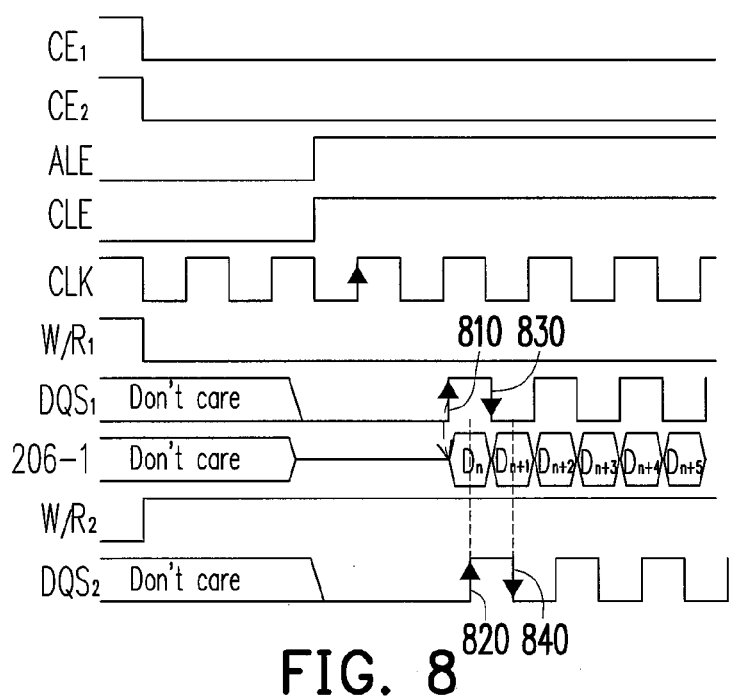
FIG. 8 is a time sequence diagram showing a first memory die and a second memory die executing data read operation and data write operation simultaneously according to an exemplary embodiment of the invention.

As shown in FIG. 8, after the first memory die 206-3 and the second memory die 206-5 have received the commands, left the busy state and prepared to initiate data transmission operation, the memory management circuit 2043 maintains the enable signals $CE_1$ and $CE_2$ at the low level so as to simultaneously enable the first memory die 206-3 and the second memory die 206-5. In addition, the memory management circuit 2043 assigns the first write/read signal $W/R_1$ and the first data queue strobe signal $DQS_1$ to the first memory die 206-3 and assigns the second write/read signal $W/R_2$ and the second data queue strobe signal $DQS_2$ to the second memory die 206-5, so as to simultaneously and respectively trigger the first memory die 206-3 to output data from the first memory die 206-3 and put the data onto the data input/output bus 206-1 in accordance with the read command and the second memory die 206-5 to write the data from the data input/output bus 206-1 to the second memory die 206-5 in accordance with the write command.

The operation of the control signals ALE, CLE and the clock signal CLK is the same as or similar to the traditional memory storage device supporting the ONFI, and thus is not repeated herein. Below are explanations of the operations of the first write/read signal $W/R_1$, the first data queue strobe signal $DQS_1$, the second write/read signal $W/R_2$ and the second data queue strobe signal $DQS_2$.

In detail, the memory management circuit 2043 simultaneously assigns the first write/read signal $W/R_1$ maintained at a first specific level (e.g., low level) and the second write/read signal $W/R_2$ maintained at a second specific level (e.g., high level) to the first memory die 206-3 and the second memory die 206-5, respectively. The first memory die 206-3 determines that the next operation to be executed is the data read operation (i.e. read the data to the data input/output bus 206-1) based on the first write/read signal $W/R_1$ maintained at the first specific level. The second memory die 206-5 determines that the next operation to be executed is the data write operation (i.e. write the data from the data input/output bus 206-1 to the temporary area of the second memory die 206-5) based on the second write/read signal $W/R_2$ maintained at the second specific level.

Afterwards, the memory management circuit 2043 first assigns the first data queue strobe signal $DQS_1$ to the first memory die 206-3. Then, the memory management circuit 2043 assigns the second data queue strobe signal $DQS_2$ to the second memory die 206-5. The first data queue strobe signal $DQS_1$ and the second data queue strobe signal $DQS_2$ assigned by the memory management circuit 2043 are strobe signals. That is, the signals will be at the first specific level and the second specific level alternately.

Referring to FIG. 8, the first memory die 206-3 outputs the data from the memory cell and transmits the data to the data input/output bus 206-1 based on the read command, at each edge (including the rising and falling edges) of the first data queue strobe signal $DQS_1$. The second memory die 206-5 stores the data transmitted on the data input/output bus 206-1 into the temporary area of the second memory die 206-5 based on the write command, at each edge (including the rising and falling edges) of the second data queue strobe signal $DQS_2$.

For example, the first memory die 206-3 transmits the data $D_n$ to the data input/output bus 206-1 at the first rising edge 810 of the first data queue strobe signal $DQS_1$. The second memory die 206-5 stores the data $D_n$ from the data input/output bus 206-1 into the temporary area of the second memory die 206-5 at the first rising edge 820 of the second data queue strobe signal $DQS_2$. In addition, the first memory die 206-3 transmits the data $D_{n+1}$ to the data input/output bus 206-1 at the first falling edge 830 of the first data queue strobe signal $DQS_1$, and the second memory die 206-5 stores the data $D_{n+1}$ from the data input/output bus 206-1 into the temporary area of the second memory die 206-5 at the first falling edge 840 of the second data queue strobe signal $DQS_2$, and so on.

Figure 9:
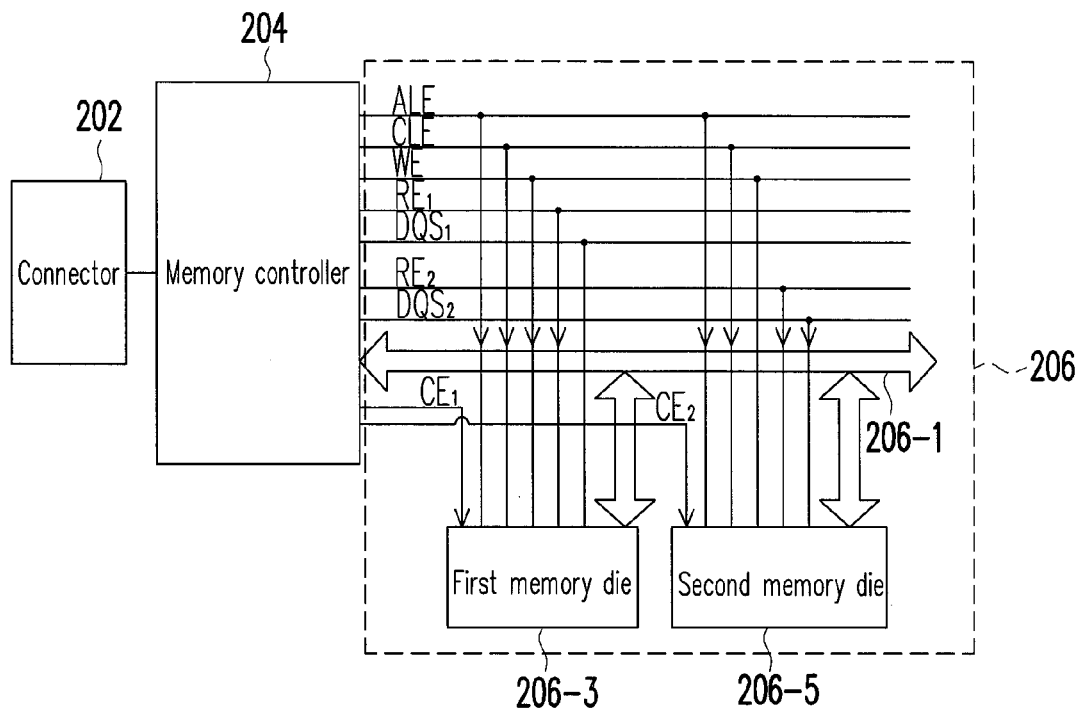
FIG. 9 schematically illustrates a memory storage device according to one exemplary embodiment of the present invention.

FIG. 9 schematically illustrates a memory storage device according to one exemplary embodiment of the present invention. In this embodiment, the rewritable non-volatile memory module 206 and the memory interface 2045 support the toggle NAND flash interface. In the traditional structure supporting the toggle NAND flash interface, all the memory dies coupled to the same data input/output bus must share the same read signal, the same write signal and the same data queue strobe signal. Because the state of the read signal is different when the memory die conducts data read operation and data write operation, to enable the data read time and the data write time to overlap, according to the embodiment in FIG. 9, the first memory die 206-3 and the second memory die 206-5 each has a read signal and a data queue strobe signal. In detail, the first read signal $RE_1$ and the first data queue strobe signal $DQS_1$ correspond to the first memory die 206-3, and the second read signal $RE_2$ and the second data queue strobe signal $DQS_2$ correspond to the second memory die 206-5.

Because the write signal WE is in the same state when the memory die conducts data read operation or data write operation, the write signal WE can be shared by the first memory die 206-3 and the second memory die 206-5. In addition, the first memory die 206-3 and the second memory die 206-5 share the control signals ALE and CLE.

When the data in the first memory die 206-3 is to be copied to the second memory die 206-5, the memory management circuit 2043 sequentially issues a read command and a write command to the first memory die 206-3 and the second memory die 206-5. The command issuing method is the same as or similar to the foregoing exemplary embodiment and thus is not repeated herein.

Figure 10:
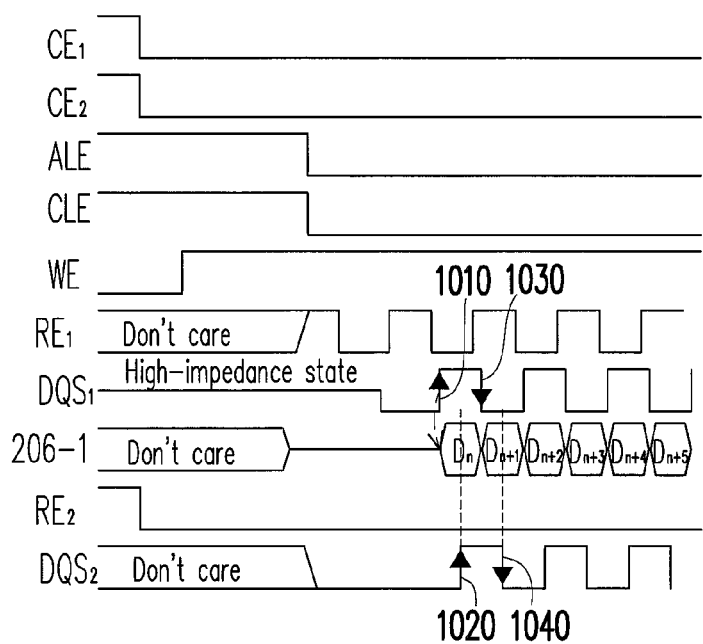
FIG. 10 is a time sequence diagram showing a first memory die and a second memory die executing data read operation and data write operation simultaneously according to an exemplary embodiment of the invention.

After the first memory die 206-3 and the second memory die 206-5 have received the commands, left the busy state and prepared to initiate the data transmission operation, according to FIG. 10, the memory management circuit 2043 maintains the enable signals $CE_1$ and $CE_2$ at a the low level so as to simultaneously enable the first memory die 206-3 and the second memory die 206-5. In addition, the memory management circuit 2043 assigns the same write signal WE to the first memory die 206-3 and the second memory die 206-5, and assigns the first read signal $RE_1$ and the first data queue strobe signal $DQS_1$ to the first memory die 206-3 and assigns the second read signal $RE_2$ and the second data queue strobe signal $DQS_2$ to the second memory die 206-5, so as to simultaneously and respectively trigger the first memory die 206-3 to output data from the first memory die 206-3 and put the data onto the data input/output bus 206-1 in accordance with the read command and the second memory die 206-5 to write the data from the data input/output bus 206-1 into the second memory die 206-5 in accordance with the write command.

The operation of the control signals ALE and CLE are the same as or similar to the traditional memory storage device supporting the toggle NAND flash interface, and thus is not repeated herein. Below are illustrations of the operations of the write signal WE, the first read signal $RE_1$, the first data queue strobe signal $DQS_1$, the second read signal $RE_2$ and the second data queue strobe signal $DQS_2$.

Specifically, the memory management circuit 2043 first assigns the second read signal $RE_2$ maintained at a first specific level (e.g., low level) to the second memory die 206-5. Afterwards, the memory management circuit 2043 simultaneously assigns the write signal WE maintained at a second specific level (e.g., high level) to the first memory die 206-3 and the second memory die 206-5. Then, the memory management circuit 2043 sequentially assigns the first read signal $RE_1$ to the first memory die 206-3, the first data queue strobe signal $DQS_1$ to the first memory die 206-3. and the second data queue strobe signal $DQS_2$ to the second memory die 206-5. The first read signal $RE_1$, the first data queue strobe signal $DQS_1$ and the second data queue strobe signal $DQS_2$, assigned by the memory management circuit 2043, are alternately at the first specific level and the second specific level.

Referring to FIG. 10, the first memory die 206-3 outputs data from the first memory die 206-3 and transmits the data to the data input/output bus 206-1 based on the read command, at each edge (including the rising and falling edges) of the first data queue strobe signal $DQS_1$. The second memory die 206-5 stores the data transmitted on the data input/output bus 206-1 to the temporary area of the second memory die 206-5 based on the write command, at each edge (including the rising and falling edges) of the second data queue strobe signal $DQS_2$. For example, the first memory die 206-3 reads out and transmits the data $D_n$ to the data input/output bus 206-1 at the first rising edge 1010 of the first data queue strobe signal $DQS_1$. The second memory die 206-5 stores the data $D_n$ from the data input/output bus 206-1 into the temporary area of the second memory die 206-5 at the first rising edge 1020 of the second data queue strobe signal $DQS_2$. In addition, the first memory die 206-3 transmits the data $D_{n+1}$ to the data input/output bus 206-1 at the first falling edge 1030 of the first data queue strobe signal $DQS_1$, and the second memory die 206-5 stores the data $D_{n+1}$ from the data input/output bus 206-1 into the temporary area of the second memory die 206-5 at the first falling edge 1040 of the second data queue strobe signal $DQS_2$, and so on.

Referring to FIGS. 6, 8 and 10 at the same time, for the memory storage device supporting the NAND flash interface, because the first memory die 206-3 only reads data at the falling edge of its read signal, and the second memory die 206-5 only writes data to the temporary area thereof at the rising edge of its write signal, only one time of data transmission operation can be completed in each signal cycle. As for the memory storage device supporting the ONFI or the toggle NAND flash interface, because the first memory die 206-3 and the second memory die 206-5 conducts data transmission operation at the rising edge and the falling edge of the data queue strobe signal, two times of data transmission operations can be completed in each signal cycle. Therefore, comparing to the memory storage device supporting the NAND flash interface, the memory storage device supporting the ONFI or the toggle NAND flash interface provides faster data transmission speed.

In the aforementioned embodiments, when the first memory die 206-3 reads out the data therein and transmits such data to the data input/output bus 206-1 (i.e. conducting data read operation), the data on the data input/output bus 206-1 will be transmitted not only to the temporary area of the second memory die 206-5, but also to the memory controller 204 to conduct the error checking and correcting procedure. Still, because the error checking and correcting procedure needs to check a complete data for error, the memory controller 204 continuously receives the data transmitted from the first memory die 206-3 to the data input/output bus 206-1, and temporarily stores such data in the buffer memory 3002. When the complete data corresponding to the read command has been entirely and temporarily stored in the buffer memory 3002, the error checking and correcting circuit 3004 conducts the error checking and correcting procedure to the aforementioned complete data.

If the error checking and correcting circuit 3004 determines no data error exists, the memory management circuit 2043 issues a program command to the second memory die 206-5, so as to issue the second memory die 206-5 to write the complete data already temporarily stored in the temporary area of the second memory die 206-5 to the one or more physical pages of the second memory die 206-5 (i.e., write to the memory cell).

If the error checking and correcting circuit 3004 determines that data error exists, because the complete data corresponding to the read command is currently temporarily stored in the temporary area and not actually written to the memory cell of the second memory die 206-5 yet, such complete data can still be corrected. Therefore, the memory management circuit 2043 issues a specific command to the second memory die 206-5 to partially correct or update the complete data temporarily stored in the temporary area of the second memory die 206-5. After the correction or the update is completed, the memory management circuit 2043 issues the program command to the second memory die 206-5 to write the corrected complete data to the physical page of the second memory die 206-5.

Figure 11:
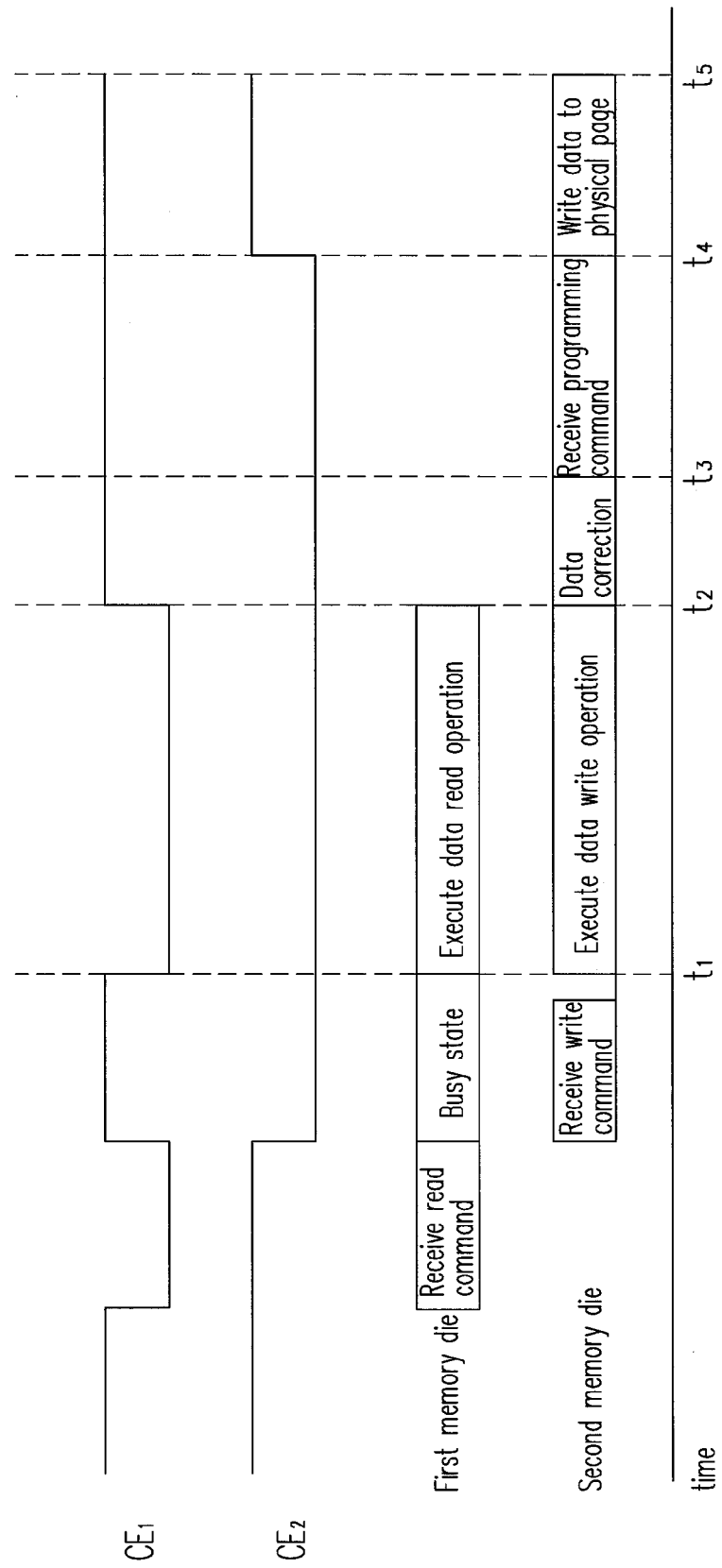
FIG. 11 is a time sequence diagram illustrating a data transmission method according to an exemplary embodiment of the present invention.

FIG. 11 is a time sequence diagram illustrating a data transmission method according to an exemplary embodiment of the present invention. Referring to FIG. 11, after the first memory die 206-3 and the second memory die 206-5 sequentially receive the read command and the write command, the data read operation and the data write operation can be started separately at the same time (i.e., the time point $t_1$). As shown in FIG. 11, between the time point $t_1$ to $t_2$, the first memory die 206-3 outputs the data from the first memory die 206-3 and transmits the data to the data input/output bus 206-1. In addition, the second memory die 206-5 writes the data from the data input/output bus 206-1 into the second memory die 206-5. In other words, the time that the data is read from the first memory die 206-3 and put onto the data input/output bus 206-1 overlaps with the time that the data is written from the data input/output bus 206-1 to the second memory die 206-5. Afterwards, if necessary (i.e., the error checking and correcting circuit 3004 determines that data error exists), the data in the temporary area of the second memory die 206-5 will be corrected (i.e., the period between the time point, $t_2$ to $t_3$ represents the data correction time). After the correction is completed, the second memory die 206-5 receives program command (i.e., the period between the time point $t_3$ to $t_4$ is the time for receiving program command). Then, from the time point $t_4$ to $t_5$, the second memory die 206-5 writes the data into the physical page of the second memory die 206-5.

As shown in FIG. 11, execution times of the data read operation and the data write operation may overlap. In addition, even when data correction is needed, the data correction time is way shorter than the execution time for the data read operation and the data write operation. Accordingly, comparing to the traditional structure, the disclosure in the present invention greatly improves the data transmission efficiency.

Figure 12:
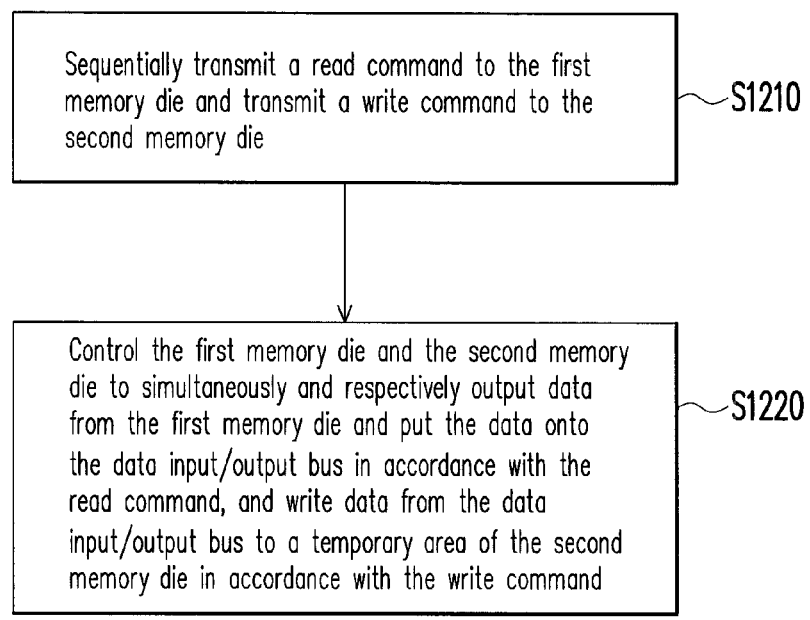
FIG. 12 is a flowchart illustrating a data transmission method according to an exemplary embodiment of the present invention.

FIG. 12 is a flowchart illustrating a data transmission method according to an exemplary embodiment of the present invention. In the present embodiment, we assume that the data in the first memory die 206-3 is to be copied to the second memory die 206-5.

Referring to FIG. 12, as shown in step S1210, the memory controller 204 first transmits the read command to the first memory die 206-3 of the rewritable non-volatile memory module 206. Then, the memory controller 204 transmits the write command to the second memory die 206-5 of the rewritable non-volatile memory module 206.

Then, as shown in step S1220, the memory controller 204 controls the first memory die 206-3 and the second memory die 206-5 to simultaneously and respectively output data from the first memory die 206-3 and put the data onto the data input/output bus 206-1 in accordance with the read command (i.e. the "data read operation"), and to write the data from the data input/output bus 206-1 to the temporary area of the second memory die 206-5 in accordance with the write command (i.e. the "data write operation").

It is to be noted that, in other embodiments, if the number of the memory dies coupled to the same data input/output bus is larger, the memory dies may be grouped to execute each step of the data transmission method illustrated in FIG. 12. For example, if eight memory dies are coupled to the same data input/output bus, the eight memory dies may be averagely divided into two groups or four groups. In addition, each group of memory die is assigned a set of signals (the signal type varies in accordance with the type of the memory interface). In other words, all the memory dies in the same group use the same set of signals, and memory dies in different groups use different set of signals. Accordingly, when data transmission between different groups of memory dies are needed, data read operation and data write operation can be executed in the same time according to the process illustrated in FIG. 12 to improve efficiency.

It is to be noted that although memory storage device supporting the NAND flash interface, the ONFI and the toggle NAND flash interface is used to explain the present invention, the present invention does not limit the types of the memory interfaces that the memory storage device supports. In other memory storage devices having the same or similar characteristics, as long as the structure of the rewritable non-volatile memory module complies with the structure of the more than two memory dies coupled to the same data input/output bus, the method in the aforementioned embodiments may be used. Such method is used to designate a respectively corresponding signal to the different memory dies coupled to the same data input/output bus so as to achieve the goal of having one memory die execute data read operation and another memory die execute data write operation at the same time.

Based on the above, the data transmission method, the memory controller and the memory storage device disclosed in the present invention relates to a structure of the same data input/output bus with a plurality of memory dies coupled to it, and that two memory dies may respectively conduct data read operation and data write operation at the same time. As a result, the data transmission speed between the two memory dies coupled to the same data input/output bus may be improved, so as to achieve the goal of enhancing efficiency. It should be noted that the advantages aforementioned not required in all versions of the invention.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data transmission method for a memory storage device having a rewritable non-volatile memory module, wherein the rewritable non-volatile memory module comprises at least one first memory die and at least one second memory die, the at least one first memory die and the at least one second memory die are coupled to a memory controller of the memory storage device by a same data input/output bus, and the data transmission method comprises:

sequentially transmitting, by the memory controller, a read command to the at least one first memory die and a write command to the at least one second memory die via the data input/output bus; and controlling, by the memory controller, the at least one first memory die and the at least one second memory die to simultaneously and respectively output data from the at least one first memory die and put the data onto the data input/output bus in accordance with the read command, and write the data from the data input/output bus to the at least one second memory die in accordance with the write command.

2. The data transmission method according to claim 1, wherein the step of controlling the at least one first memory die and the at least one second memory die to simultaneously and respectively output the data from the at least one first memory die and put the data onto the data input/output bus, and write the data from the data input/output bus to the at least one second memory die comprises:

simultaneously enabling the at least one first memory die and the at least one second memory die; and assigning a first read signal and a first write signal to the at least one first memory die and assigning a second read signal and a second write signal to the at least one second memory die, to trigger the at least one first memory die and the at least one second memory die to simultaneously and respectively output the data from the at least one first memory die and put the data onto the data input/output bus, and write the data from the data input/output bus to the at least one second memory die.

3. The data transmission method according to claim 2, wherein the first write signal and the second read signal are maintained at a first specific level, and the first read signal and the second write signal are alternately at the first specific level and a second specific level, wherein the step of triggering the at least one first memory die and the at least one second memory die to simultaneously and respectively output the data from the at least one first memory die and put the data onto the data input/output bus, and write the data from the data input/output bus to the at least one second memory die comprises:

transmitting, by the at least one first memory die, the data onto the data input/output bus at each first type of edge of the first read signal; and storing, by the at least one second memory die, the data transmitted on the data input/output bus to a temporary area of the at least one second memory die at each second type of edge of the second write signal.

4. The data transmission method according to claim 1, wherein the step of the memory controller controlling the at least one first memory die and the at least one second memory die to simultaneously and respectively output the data from the at least one first memory die and put the data onto the data input/output bus, and write the data from the data input/output bus to the at least one second memory die comprises:

simultaneously enabling the at least one first memory die and the at least one second memory die; and assigning a first write/read signal and a first data queue strobe (DQS) signal to the at least one first memory die and assigning a second write/read signal and a second DQS signal to the at least one second memory die, to trigger the at least one first memory die and the at least one second memory die to simultaneously and respectively output the data from the at least one first memory die and put the data onto the data input/output bus, and write the data from the data input/output bus to the at least one second memory die.

5. The data transmission method according to claim 4, wherein the first write/read signal is maintained at a first specific level, and the second write/read signal is maintained at a second specific level, wherein the first DQS signal and the second DQS signal are alternately at the first specific level and the second specific level, wherein the step of triggering the at least one first memory die and the at least one second memory die to simultaneously and respectively output the data from the at least one first memory die and put the data onto the data input/output bus, and write the data from the data input/output bus to the at least one second memory die comprises:

transmitting, by the at least one first memory die, the data onto the data input/output bus at each edge of the first DQS signal; and storing, by the at least one second memory die, the data transmitted on the data input/output bus to a temporary area of the at least one second memory die at each edge of the second DQS signal.

6. The data transmission method according to claim 1, wherein the step of controlling the at least one first memory die and the at least one second memory die to simultaneously and respectively output the data from the at least one first memory die and put the data onto the data input/output bus, and write the data from the data input/output bus to the at least one second memory die comprises:

simultaneously enabling the at least one first memory die and the at least one second memory die; and assigning the same write signal to the at least one first memory die and the at least one second memory die, assigning a first read signal and a first DQS signal to the at least one first memory die, assigning a second read signal and a second DQS signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

7. The data transmission method according to claim 6, wherein the write signal is maintained at a second specific level, and the second read signal is maintained at a first specific level, the first read signal, the first DQS signal and the second DQS signal are alternately at the first specific level and the second specific level, wherein the step of triggering the at least one first memory die and the at least one second memory die to simultaneously and respectively read the data from the at least one first memory die and put the data onto the data input/output bus, and write the data on the data input/output bus to the at least one second memory die comprises:

transmitting, by the at least one first memory die, the data onto the data input/output bus at each edge of the first DQS signal; and storing, by the at least one second memory die, the data transmitted on the data input/output bus to a temporary area of the at least one second memory die at each edge of the second DQS signal.

8. The data transmission method according to claim 1 further comprising:
- continuously receiving, by the memory controller, the data transmitted on the data input/output bus by the at least one first memory die; and
- after entirely receiving a complete data corresponding to the read command, executing an error checking and correcting procedure to the complete data.

9. The data transmission method according to claim 8, wherein after the step of executing the error checking and correcting procedure to the complete data, the data transmission method further comprises:
- if no data error exists, writing the complete data temporarily stored in a temporary area of the at least one second memory die to at least one physical page of the at least one second memory die; and
- if data error exists, issuing a specific command to the at least one second memory die to correct the complete data temporarily stored in the temporary area of the at least one second memory die, and writing the corrected complete data to the at least one physical page of the at least one second memory die.

10. A memory controller, for managing a rewritable non-volatile memory module of a memory storage device, the memory controller comprising:
- a host system interface, configured to couple a host system;
- a memory interface, configured to couple at least one first memory die and at least one second memory die of the rewritable non-volatile memory module via a data input/output bus; and
- a memory management circuit, coupled to the host system interface and the memory interface,
- wherein the memory management circuit sequentially transmits a read command to the at least one first memory die and then transmits a write command to the at least one second memory die, and controls the at least one first memory die and the at least one second memory die to simultaneously and respectively output data from the at least one first memory die and put the data onto the data input/output bus in accordance with the read command, and write the data from the data input/output bus to the at least one second memory die in accordance with the write command.

11. The memory controller according to claim 10, wherein the memory interface is a NAND flash interface, the memory management circuit simultaneously enables the at least one first memory die and the at least one second memory die, and assigns a first read signal and a first write signal to the at least one first memory die, and assigns a second read signal and a second write signal to the at least one second memory die, to trigger the at least one first memory die and the at least one second memory die to simultaneously and respectively output the data from the at least one first memory die and put the data onto the data input/output bus, and write the data from the data input/output bus to the at least one second memory die.

12. The memory controller according to claim 11, wherein the first write signal and the second read signal are maintained at a first specific level, and the first read signal and the second write signal are alternately at the first specific level and a second specific level, and the at least one first memory die transmits the data onto the data input/output bus at each first type of edge of the first read signal, and the at least one second memory die stores the data transmitted on the data input/output bus to a temporary area of the at least one second memory die at each second type of edge of the second write signal.

13. The memory controller according to claim 10, wherein the memory interface is an open NAND flash interface (ONFI), the memory management circuit simultaneously enables the at least one first memory die and the at least one second memory die, and assigns a first write/read signal and a first data queue strobe (DQS) signal to the at least one first memory die, and assigns a second write/read signal and a second DQS signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

14. The memory controller according to claim 13, wherein the first write/read signal is maintained at a first specific level, and the second write/read signal is maintained at a second specific level, and the first DQS signal and the second DQS signal are alternately at the first specific level and the second specific level, and the at least one first memory die transmits the data onto the data input/output bus at each edge of the first DQS signal, and the at least one second memory die stores the data transmitted on the data input/output bus to a temporary area of the at least one second memory die at each edge of the second DQS signal.

15. The memory controller according to claim 10, wherein the memory interface is a toggle NAND flash interface, the memory management circuit simultaneously enables the at least one first memory die and the at least one second memory die, and assigns the same write signal to the at least one first memory die and the at least one second memory die, and assigns a first read signal and a first DQS signal to the at least one first memory due, and assigns a second read signal and a second DQS signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

16. The memory controller according to claim 15, wherein the write signal is maintained at a second specific level, the second read signal is maintained at a first specific level, and the first read signal, the first DQS signal and the second DQS signal are alternately at the first specific level and the second specific level, and the at least one first memory die transmits the data onto the data input/output bus at each edge of the first DQS signal, and the at least one second memory die stores the data transmitted on the data input/output bus to a temporary area of the at least one second memory die at each edge of the second DQS signal.

17. The memory controller according to claim 10 further comprising:
- an error checking and correcting circuit, coupled to the memory management circuit; and
- a buffer memory, coupled to the memory management circuit,
- wherein the buffer memory continuously receives the data transmitted on the data input/output bus by the at least one first memory die, and after the buffer memory entirely receives a complete data corresponding to the read command, the error checking and correcting circuit executes an error checking and correcting procedure to the complete data.

18. The memory controller according to claim 17, wherein if the error checking and correcting circuit determines no data error exists, the memory management circuit issues the at least one second memory die to write the complete data temporarily stored in a temporary area of the at least one second memory die to at least one physical page of the at least one second memory die; and if the error checking and correcting circuit determines data error exists, the memory management circuit issues a specific command to the at least one second memory die to correct the complete data temporarily stored in the temporary area of the at least one second memory die, and issues the at least one second memory die to write the corrected complete data to the at least one physical page of the at least one second memory die.

19. A memory storage device comprising:
a rewritable non-volatile memory module, comprising at least one first memory die and at least one second memory die;
a connector, configured to couple a host system;
a memory controller, coupled to the connector, and coupled to the at least at least one first memory die and the at least one second memory die by a same data input/output bus,
wherein the memory controller sequentially transmits a read command to the at least one first memory die and then transmits a write command to the at least one second memory die, and controls the at least one first memory die and the at least one second memory die to simultaneously and respectively output data from the at least one first memory die and put the data onto the data input/output bus in accordance with the read command, and write the data from the data input/output bus to the at least one second memory die in accordance with the write command.

20. The memory storage device according to claim 19, wherein the rewritable non-volatile memory module supports a NAND flash interface, the memory controller simultaneously enables the at least one first memory die and the at least one second memory die, and assigns a first read signal and a first write signal to the at least one first memory die, and assigns a second read signal and a second write signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

21. The memory storage device according to claim 20, wherein the first write signal and the second read signal are maintained at a first specific level, and the first read signal and the second write signal are alternately at the first specific level and a second specific level, and the at least one first memory die transmits the data onto the data input/output bus at each first type of edge of the first read signal, and the at least one second memory die stores the data transmitted on the data input/output bus to a temporary area of the at least one second memory die at each second type of edge of the second write signal.

22. The memory storage device according to claim 19, wherein the rewritable non-volatile memory module supports an open NAND flash interface, the memory controller simultaneously enables the at least one first memory die and the at least one second memory die, and assigns a first write/read signal and a first data queue strobe (DQS) signal to the at least one first memory die, and assigns a second write/read signal and a second DQS signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

23. The memory storage device according to claim 22, wherein the first write/read signal is maintained at a first specific level, and the second write/read signal is maintained at a second specific level, and the first DQS signal and the second DQS signal are alternately at the first specific level and the second specific level, and the at least one first memory die transmits the data onto the data input/output bus at each edge of the first DQS signal, and the at least one second memory die stores the data transmitted on the data input/output bus to a temporary area of the at least one second memory die at each edge of the second DQS signal.

24. The memory storage device according to claim 19, wherein the memory interface supports a toggle NAND flash interface, the memory controller simultaneously enables the at least one first memory die and the at least one second memory die, and assigns the same write signal to the at least one first memory die and the at least one second memory die, and assigns a first read signal and a first DQS signal to the at least one first memory die, and assigns a second read signal and a second DQS signal to the at least one second memory die, so as to trigger the at least one first memory die and the at least one second memory die to simultaneously and respectively output the data from the at least one first memory die and put the data onto the data input/output bus, and write the data from the data input/output bus to the at least one second memory die.

25. The memory storage device according to claim 24, wherein the write signal is maintained at a second specific level, the second read signal is maintained at a first specific level, and the first read signal, the first DQS signal and the second DQS signal are alternately at the first specific level and the second specific level, and the at least one first memory die transmits the data onto the data input/output bus at each edge of the first DQS signal, and the at least one second memory die stores the data transmitted on the data input/output bus to a temporary area of the at least one second memory die at each edge of the second DQS signal.

26. The memory storage device according to claim 19, wherein the memory controller continuously receives the data transmitted from the at least one first memory die to the data input/output bus, and after entirely receiving a complete data corresponding to the read command, the memory controller executes an error checking and correcting procedure to the complete data.

27. The memory storage device according to claim 26, wherein after executing the error checking and correcting procedure, if no data error exists, the memory controller issues the at least one second memory die to write the complete data temporarily stored in a temporary area of the at least one second memory die into at least one physical page of the at least one second memory die, if data error exits, the memory controller issues a specific command to the at least one second memory die to correct the complete data temporarily stored in the temporary area of the at least one second memory die, and issues the at least one second memory die to write the corrected complete data into the at least one physical page of the at least one second memory die.

\* \* \* \* \*